United States Patent Office 3,144,428
Patented Aug. 11, 1964

3,144,428
CONTACT ADHESIVE COMPOSITIONS
Stephen J. Kost, Cincinnati, Ohio, assignor to Formica Corporation, Cincinnati, Ohio, a corporation of Delaware
No Drawing. Filed Mar. 1, 1962, Ser. No. 176,774
3 Claims. (Cl. 260—43)

This invention relates to novel high-strength contact adhesive compositions. More particularly, this invention relates to novel contact adhesive compositions which develop high strength at room temperature without the aid of catalysts or heat and retain their strength even at elevated temperatures, making them particularly suitable for use in bonding decorative laminates to various substrates.

A wide variety of contact adhesive compositions have been formulated for use in bonding decorative laminates such as melamine-formaldehyde resin-impregnated decorative laminates, to substrates such as plywood, flakeboard, and the like. However, few if any of such adhesives have proven entirely satisfactory, since for this as well as other similar applications an adhesive must meet a number of stringent physical and chemical requirements. This is particularly true in those cases where the decorative laminate being bonded has a tendency to warp. An acceptable contact adhesive must dry rapidly at room temperature to form a firm temporary bond, and must thereafter rapidly increase in internal strength as measured at both room temperature and elevated temperatures to produce a bond which is resistant to stresses from all directions as well as to degradation by oils, chemicals, water, heat and the like. Furthermore, despite the requirement of rapid drying, it must retain sufficient adhesiveness long enough after application to permit the coated materials to be properly positioned. At the same time, the adhesive must not affect the physical and chemical properties of the materials it joins. Finally, it must be stable at room temperature, and preferably should have a long shelf-life.

Contact adhesive compositions based on polymers of chloroprene, especially neoprene (polychloroprene) have perhaps come the closest to meeting these many requirements in the art of bonding decorative laminates to various substrates. As a result, numerous adhesive compositions of this general type have been disclosed in the prior art. Early examples of such adhesives comprised blends of neoprene and a phenol-aldehyde resin dispersed in a suitable volatile solvent. A later modification of such compositions involved the incorporation of relatively large amounts of alkali or alkaline earth metal oxides or hydroxides into the blend. However, all such prior art compositions have at least one serious disadvantage, in that they rapidly lose bond strength when subjected to elevated temperatures for any considerable period of time.

I have now discovered novel high-strength contact adhesive compositions based on polymers of chloroprene which overcome the aforementioned disadvantage while retaining the advantages normally associated with adhesive compositions of this general type. More particularly, the present invention provides novel high-strength contact adhesive compositions comprising a blend of (A) a polymer of chloroprene, e.g., neoprene, (B) a potentially heat-hardenable para-hydrocarbon-substituted phenol-aldehyde resinous reaction product which has been modified by incorporating therewith magnesium oxide, (C) a terpene-phenolic resinous reaction product, and (D) an epoxy novolac resin, in certain prescribed quantities, as will be set forth more fully hereinbelow, which are stable at room temperature, have a long shelf-life, develop high strength at room temperature without the aid of catalysts or heat, and retain their strength even when exposed to elevated temperatures for considerable periods of time.

It is, therefore, an object of my invention to provide novel high-strength contact adhesive compositions.

It is also an object of my invention to provide novel high-strength contact adhesive compositions based on polymers of chloroprene such as neoprene.

A further object of my invention is to provide novel high-strength contact adhesive compositions which are particularly suitable for use in bonding decorative laminates, such as melamine-formaldehyde resin-impregnated decorative laminates, to various substrates.

These and other objects of my invention will be discussed more fully hereinbelow.

Any commercially available polymer of chloroprene may be employed in the practice of the present invention. Furthermore, the polymer of chloroprene may be either a homopolymer, i.e., neoprene, or a copolymer of chloroprene with minor proportions of comonomers such as butadiene, isoprene, or vinyl monomers such as acrylonitrile, acrylates, or methacrylates, such as methyl methacrylate and the like, with the more crystalline forms of polychloroprene, e.g., Neoprene AD, Neoprene AC, Neoprene CG, Neoprene W, and the like, being preferred. The polymer of chloroprene may also have incorporated therewith minor amounts of conventionally employed materials, e.g., from about 2% to about 6% by weight, based on the weight of the polymer of chloroprene, of acid acceptor materials such as lightly calcined magnesia, up to about 3% by weight, based on the weight of the polymer of chloroprene, of antioxidants such as p-methyl-o-tert-butyl methylenebisphenol or the corresponding p-lower alkyl-substituted derivatives thereof, and from about 3% to about 7% by weight, based on the weight of the polymer of chloroprene, of fillers such as zinc oxide, as well as pigments, dyes, and the like, inasmuch as the presence of such materials in minor amounts will not affect the adhesive characteristics of the compositions of the present invention.

Potentially heat-hardenable para-hydrocarbon-substituted phenol-aldehyde resinous reaction products are well known in the art as shown, for example, in U.S. Patent No. 2,173,346 to Turkington et al., which is incorporated herein by reference. In general, the conventional methods for their preparation involves the basic step of condensing the phenolic reactant, e.g., p-propyl phenol, p-n-butyl phenol, p-t-butyl phenol, p-t-amyl phenol, p-octyl phenol, p-cyclohexyl phenol, p-phenyl phenol, p-benzyl phenol, and the like, with a molar equivalent or excess of the aldehyde, e.g., from about 1 mol to about 2 mols of formaldehyde, acetaldehyde, benzaldehyde, and the like, or a compound engendering formaldehyde, such as paraformaldehyde, hexamethylenetetramine, and the like, per mol of the phenolic reactant, in the presence of an alkaline catalyst, such as sodium, potassium or ammonium hydroxide, sodium carbonate, and the like. The resulting reaction products are potentially thermoset resinous condensates, i.e., ones which have been carried to an intermediate stage of condensation. More particularly, at this stage they are fusible, oil-soluble resinous materials having short to medium length reactive methylol-terminated molecular chains and little or no cross-linkages.

As indicated above, in practicing the present invention the potentially heat-hardenable para-hydrocarbon-substituted phenol-aldehyde resinous reaction product employed is modified by incorporating therewith an amount of reactive magnesium oxide which is sufficient to substantially completely react with said reaction product, e.g., an amount of magnesium oxide ranging from about 5% to about 20% by weight, and preferably from about 7% to about 15% by weight, based on the weight of said potentially heat-hardenable resinous reaction product. This modification produces a material which is non-melting at the melting point of the unmodified potentially heat-hardenable para-hydrocarbon-substituted phenol-aldehyde resinous reaction product. Thus, when heated, the modified material will char before it melts, and thereby serves to increase the heat-resistance of the final adhesive composition. Addition of the magnesium oxide to the potentially heat-hardenable resinous reaction product may be accomplished by any suitable method. For example, the resinous reaction product, dissolved in a suitable solvent, such as benzene, toluene, xylene, hexane, methyl ethyl ketone, and the like, or a mixture thereof, may be admixed with the magnesium oxide and then reacted at a temperature ranging from room temperature, i.e., about 60° F., to about 100° F. for from about 4 to about 12 hours.

The terpene-phenolic resinous reaction products employed in the practice of the present invention are also well known in the art, and have been described in numerous U.S. Patents, such as 2,284,156 to Lemmer et al., 2,343,845 to Power, and 2,378,436; 2,471,453; 2,471,454 and 2,471,455 to Rummelsburg, among others, each of which is also incorporated herein by reference. In general the conventional methods for their preparation involve the basic step of reacting, at a temperature of from about −10° C. to about 150° C., a terpene hydrocarbon of the $C_{10}H_{16}$ series, such as α-pinene, β-pinene, limonene and the like, or, more commonly, a naturally occurring mixture of terpene hydrocarbons, with a phenol, such as phenol itself or a p-substituted phenol of the type mentioned hereinabove, in the presence of an acidic catalyst, such as hydrogen fluoride, boron trifluoride, p-toluenesulfonic acid, and the like. In carrying out this reaction, it is usually desirable to use equimolar amounts of terpene and phenol. However, an excess of either terpene or phenol may be used, e.g., from about 0.2 to about 2 mols of phenol per mol of terpene. Furthermore, numerous modifications of this basic process are known, and it is contemplated that the resins produced thereby may also be employed in the practice of the present invention. For example, the terpene or mixtures of terpenes, together with the phenol, may be co-reacted with a relatively small amount of an aldehyde, such as formaldehyde. Similarly, the terpene-phenolic resin may be extended or modified by the addition thereto of rosin or an acid anhydride, such as maleic anhydride, followed by esterification of the rosin or anhydride. In addition, alcohol derivatives of terpenes, e.g., 2-terpineol, may be used either together with or in place of the terpene hydrocarbon itself. The terpene-phenolic resin component of my novel high-strength contact adhesive compositions serves primarily as a tackifier.

The epoxy novolac resins employed in the practice of the present invention are commercially available polyfunctional epoxidized resinous reaction products obtained by reacting a phenol-aldehyde resinous condensate, e.g., a phenol-formaldehyde resinous condensate, with an epihalohydrin, e.g., epichlorohydrin. One class of epoxy novolacs which has proven especially suitable for use in the practice of the present invention encompasses materials which may be represented by the general formula:

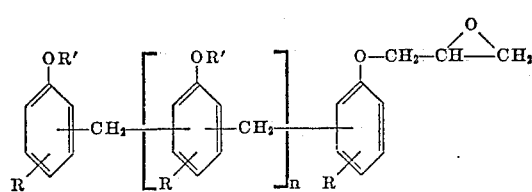

wherein R represents either hydrogen or a lower alkyl group, such as methyl, ethyl, and the like, R' represents hydrogen, a halohydrin group, e.g.,

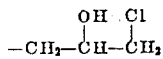

a glycol group e.g.,

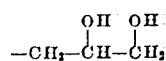

or a glycidyl group, i.e.,

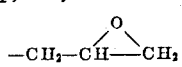

and $n$ is a number such that the epoxy functionality of the novolac, i.e., the average number of epoxy groups per molecule, ranges from about 1.9 to about 3,3. In general, epoxy novolac resins of this type range in average molecular weight from about 350 to about 1300, as termined by the vapor pressure thermistor method [see A. Wilson, Z. Bini, and R. Hofstader, "Thermistor Micromethod for Molecular Weight;" Anal. Chem., vol. 33, pages 135 to 137 (January 1961)]. Epoxy novolac resins have been described, for example, in Harper, "Electronic Packaging With Resins" (New York: McGraw-Hill Book Company, Inc., 1961) at pages 64–68, inclusive. One convenient method for their preparation involves simply reacting the phenolic condensate with an epihalohydrin in the presence of a basic catalyst, such as sodium hydroxide and the like.

The high-strength contact adhesive compositions of the present invention are preferably employed as solutions in a suitable volatile organic solvent, i.e., any solvent for chloroprene polymers, such as benzene, toluene, xylene, hexane, methyl ethyl ketone, and the like, or mixtures thereof, which furnishes the required degree of spreadibility and open tack-life to the adhesive. Inert diluents, e.g., petroleum naphthas such as the Varsols, may also be employed in admixture with the particular solvent or solvents chosen. In preparing these compositions from about 25% to about 200% by weight, and preferably from about 40% to about 100% by weight, of the magnesium oxide-modified potentially heat-hardenable para-hydrocarbon-substituted phnol-aldehyde resinous reaction product, from about 10% to about 40% by weight, and preferably from about 15% to about 30% by weight, of the terpene-phenolic resinous reaction product, and from about 25% to about 200% by weight, and preferably from about 40% to about 100% by weight, of the epoxy novolac resin, each based on the weight of the polymer of chloroprene, will be blended together with the polymer of chloroprene.

A preferred method of preparing my high-strength contact adhesive compositions involves first milling the polymer of chloroprene, together with the desired amounts of acid acceptors, antioxidants, fillers, pigments, and the like, if such materials are employed, on a rubber mill at a temperature not substantially greater than about 160° F., e.g., at a temperature of from about 140° F. to about 150° F., until a substantially homogeneous blend is obtained. If necessary, this blend may then be comminuted to permit greater ease of solution. Next, the remaining resinous componets of the adhesive composition, i.e., the magnesium oxide-modified potentially heat-hardenable para-hydrocarbon-substituted phenol-aldehyde resinous reaction product, the terpene-phenolic resinous reaction product and the epoxy novolac resin, are dissolved in the volatile organic solvent, preferably at room temperature. Finally, the milled polymer of chloroprene is added to the remaining componets in the solvent, again preferably at room temperature, and the resulting mixture is blended until substantially homogeneous. Alternatively, inasmuch as the order of addition of the polymer of chloroprene and the remaining components to the solvent is not critical, the milled polymer of chloroprene may be added to the solvent first, followed by the remaining components. Similarly, the milled polymer of chloroprene and the remaining components may each be dissolved in part of the volatile organic solvent and then blended together. However, by operating in the preferred manner, i.e., dissolving the other components in the solvent before adding the milled polymer of chloroprene, the viscosity of the formulation remains low until the polymer of chloroprene has been added.

The relative proportions of the volatile organic solvent to the combined amount of the four essential components may be varied over a wide range, depending primarily on the viscosity desired in the adhesive composition, which in turn will depend on the method to be employed in applying the adhesive to the materials being bonded. For instance, if the adhesive is to be applied using a doctor knife or similar spreading means, relatively viscous solutions, amounting in some cases to fairly stiff pastes, will be prepared. In such cases, relatively small amounts of solvent are needed. If, on the other hand, the composition is to be applied by brush- or roller-coating, larger amounts of solvent will be employed. In general, however, the amount of solvent employed will usually be such that the combined amount of the four essential components will be present in solution in a solids content ranging from about 10% to 50% by weight, based on the total weight of the solution.

As indicated hereinabove, the novel high-strength contact adhesive compositions of the present invention are particularly suitable for use in bonding decorative laminates, such as melamine-formaldehyde resin-impregnated decorative laminates, to various substrates. These substrates include wood, e.g., plywood, flakeboard, and the like, brick, metals, plaster, cement, glass, and the like. In employing my adhesives for this purpose, the usual procedure is to first coat each of the surfaces to be bonded and then allow the adhesive to stand thereon until substantially all of the solvent has evaporated and the coated surface is free from tack. Ordinarily, this will take from about 15 to 60 minutes. The absence of tack may be determined by lightly pressing a piece of kraft paper against the surface from time to time until the point is reached at which the adhesive no longer sticks to the paper. The two coated surfaces are then pressed together, e.g., by passing a hand roller over one of the surfaces being bonded, and allowed to set in place. The inherently tacky nature of the adhesive will hold the surfaces together until a permanent bond is developed.

My adhesives may also be used to bond materials such as vinyl cloth to wood or to rigid plastic foams, asphalt or vinyl tile to cement, and also to bond brick, plastics, paper, cement surfaces, plaster surfaces, metals, glass, cloth, leather and the like to themselves or to each other. Furthermore, in any of the aforementioned applications, the surfaces being bonded may be either horizontal or vertical, and may also be curved or contoured as well as planar.

In order that those skilled in the art may more fully understand the inventive concept presented herein, the following examples are set forth. These examples are given solely by way of illustration and should not be considered as expressing limitations unless so set forth in the appended claims. All parts and percentages are by weight, unless otherwise stated.

PREPARATION OF NEOPRENE MILLSTOCK (RESIN A)

90.8 parts of Neoprene AD were milled on a rubber mill at a temperature of about 150° F. until the neoprene formed a continuous sheet around the mill. Next 1.1 parts of p-methyl-o-tert-butyl methylenebisphenol, 3.6 parts of magnesium oxide and 4.5 parts of zinc oxide were milled into the neoprene sheet, while maintaining the temperature at about 150° F., until they were evenly dispersed. The resulting neoprene millstock, after being chopped into small pieces, was ready for use.

PREPARATION OF MAGNESIUM OXIDE-MODIFIED p-TERT-BUTYL PHENOL-FORMALDEHYDE RESIN (RESIN B)

36.2 parts of SP–126 p-tert-butyl phenolformaldehyde resin (melting point 77–81° C.; Schenectady Varnish Co.) were dissolved at room temperature, with stirring, in 60.6 parts of toluene contained in a suitable closed reaction vessel equipped with stirring means. Next, 3.2 parts of calcined magnesium oxide were slowly added, with stirring, to the resin solution. The resulting reaction mixture was then stirred for 8 hours at room temperature. Following this reaction period, the modified resin was stored in a closed container until used.

*Example I*

Ten parts of the above-prepared magnesium oxide-modified p-tert-butyl phenol-formaldehyde resin (resin B), 15 parts of DEN 438 epoxy novolac resin (Dow Chemical Co.), a polyfunctional epoxidized phenolformaldehyde resinous condensate having the general formula:

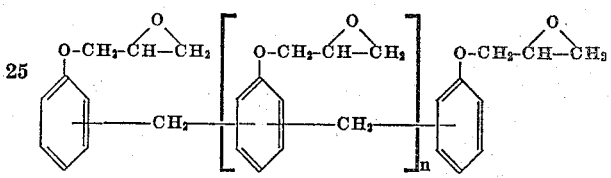

wherein $n$ equals 1.3, corresponding to an epoxy functionality of 3.3, and 4 parts of Durez 12603 terpene-phenolic resin (melting point 132–137° C.; Hooker Chemical Co.) were dissolved in a mixed solvent consisting of 34 parts of methyl ethyl ketone and 30 parts of toluene. The resulting resin solution was then charged, together with 15 parts of the above-prepared neoprene millstock (Resin A), to a churn-type mixer and mixed at room temperature until a substantially homogeneous blend was obtained.

*Example II*

The procedure of Example I was repeated using 10 parts of magnesium oxide-modified p-tert-butyl phenol-formaldehyde resin (Resin B), 7 parts of DEN 438 epoxy novolac resin, 4 parts of Durez 12603 terpene-phenolic resin, 40 parts of methyl ethyl ketone, 35 parts of toluene and 15 parts of neoprene millstock to give a substantially homogeneous adhesive blend possessing excellent initial grab, easy spreadability, smooth flowout, extended open time and excellent bond strength at room and elevated temperatures.

In order to demonstrate the peel strength and heat-resistance exhibited by this adhesive blend in use, the following tests were conducted:

*Peel strength test (conducted according to A.S.T.M. Standard D903–49).*—Peel strength is the average load per unit width of bond line required to separate progressively one member from the other over the adhered surfaces at a separation angle of approximately 180 degrees and at a uniform separation rate for this test, a separation rate of 2 inches per minute was used), and is expressed in pounds per inch of width.

Three strips, each 1 inch wide and 5 inches long, were cut from a 1/16-inch thick piece of a commercially available standard grade high pressure decorative laminate (thermoset phenolic resin-impregnated kraft paper non-decorative surface). Immediately before use, the non-decorative surface of each strip was sanded with #3/0 grit sandpaper and the sanding residue removed. Next, the non-decorative surface of each laminate strip and one surface of each of three 5 inch long pieces of 1 inch wide natural canvas webbing were coated for a distance of 4 inches from one end with a smooth, approximately 0.01 inch thick film of the adhesive blend. The coated surfaces were then allowed to air-dry at room temperature. Ten minutes after the point was reached at which a piece of kraft paper did not stick to the adhesive when pressed against it, the three test specimens (one laminate strip bonded to one piece of canvas webbing) were assembled and hand-pressed together using a Jay Roller. The assembled test specimens were then aged for seven days by exposing them to a relative humidity of 50±2% at a temperature of 73.4±2° F. Following the aging period, the specimens were tested for peel strength on a Dillon Tensile Tester with a rate loading of 2 inches per minute, the webbing being pulled in line and parallel to the laminate strip. The average peel strength of the adhesive for the three test specimens was found to be 27.0 pounds per inch.

*Heat-resistance test.*—The purpose of this test is to indicate the amount of heat required to effect the resistance to delamination of the adhesive when used to bond an actual construction assembly.

The non-decorative surfaces of two 11 inch squares of 1/16-inch thick commercially available standard grade high pressure decorative laminate (thermoset phenolic resin-impregnated kraft paper non-decorative surface) and one surface of each of two 11 inch squares of 3/4-inch thick Flakeboard were completely coated with a smooth, approximately 0.01 inch thick film of the adhesive blend. The coated surfaces were then allowed to air-dry at room temperature. Ten minutes after the point was reached at which a piece of kraft paper did not stick to the adhesive when pressed against it, the two test specimens (one laminate square bonded to one Flakeboard square) were assembled and hand-pressed together using a Jay Roller, with care being taken to insure that the edges of the laminate squares were tightly bonded to the edges of the Flakeboard substrate on all sides. The two test specimens were then aged at room temperature for 24 hours. Following this aging period, potentiometer wires were secured to the surface of each laminate to measure heat on the surfaces of the test specimens, and each specimen was then inserted in a test jig consisting of an infrared lamp contained in a metal chimney with windows, the chimney being designed to direct all the heat given off by the lamp to the test specimen. The lamp was turned on and its height above the surface of the laminate was adjusted to give a temperature of 140° F. on said surface. After being exposed to this temperature for 1 hour the laminate had lifted 1/32 of an inch from the substrate, indicating a very high degree of heat-resistance for the adhesive.

It will be obvious to those skilled in the art that other changes and variations may be made in carrying out the present invention without departing from the spirit and scope thereof as defined in the appended claims.

I claim:
1. A high-strength contact adhesive composition comprising a substantially homogeneous blend of:
   (A) a polymer of chloroprene,
   (B) from about 25% to about 200% by weight of a reaction product of a potentially heat-hardenable para-hydrocarbon-substituted phenol-aldehyde resinous reaction product with an amount of magnesium oxide sufficient to substantially completely react therewith, (C) from about 10% to about 40% by weight of a terpene-phenolic resinous reaction product, and
   (D) from about 25% to about 200% by weight of an epoxy novolac resin,
the weights of said (B), (C) and (D) each being based on the weight of the polymer of choloroprene present.

2. A high-strength contact adhesive composition comprising a substantially homogeneous blend of:
   (A) a polymer of chloroprene,
   (B) from about 25% to about 200% by weight of a reaction product of a potentially heat-hardenable para-hydrocarbon-substituted phenol-aldehyde resinous reaction product with from about 5% to about 20% by weight, based on the weight of said potentially heat-hardenable resinous reaction product, of magnesium oxide,
   (C) from about 10% to about 40% by weight of a terpene-phenolic resinous reaction product, and
   (D) from about 25% to about 200% by weight of an epoxy novolac resin,
the weights of said (B), (C) and (D) each being based on the weight of the polymer of chloroprene present.

3. A high-strength contact adhesive composition comprising a substantially homogeneous blend of:
   (A) polychloroprene,
   (B) from about 40% to about 100% by weight of a reaction product of a potentially heat-hardenable p-tert-butyl phenolformaldehyde resinous reaction product with from about 7% to about 15% by weight, based on the weight of said potentially heat-hardenable resinous reaction product, of magnesium oxide,
   (C) from about 15% to about 30% by weight of a terpene-phenolic resinous reaction product, and
   (D) from about 40% to about 100% by weight of an epoxy novolac resin,
the weights of said (B), (C) and (D) each being based on the weight of polychloroprene present.

References Cited in the file of this patent
UNITED STATES PATENTS
2,918,442    Gerrard et al. _____ Dec. 22, 1959

UNITED STATES PATENT OFFICE
CERTIFICATE OF CORRECTION

Patent No. 3,144,428                  August 11, 1964

Stephen J. Kost

It is hereby certified that error appears in the above numbered patent requiring correction and that the said Letters Patent should read as corrected below.

Column 2, line 46, for "involves" read -- involve --; column 3, lines 21 and 22, for "numerout" read -- numerous --; column 4, line 16, for "3,3" read -- 3.3 --; line 19, for "termined" read -- determined --; line 42, for "phnol-aldehyde" read -- phenol-aldehyde --; column 5, line 24, for "to 50%" read -- to about 50% --; column 6, line 57, after "49" insert a closing parenthesis; line 61, before "for" insert an opening parenthesis .

Signed and sealed this 24th day of November 1964.

(SEAL)
Attest:

ERNEST W. SWIDER
Attesting Officer

EDWARD J. BRENNER
Commissioner of Patents